(12) United States Patent
Oki et al.

(10) Patent No.: US 8,387,521 B2
(45) Date of Patent: Mar. 5, 2013

(54) KNEADED DOUGH DIVIDING APPARATUS

(75) Inventors: Yuzuru Oki, Fujisawa (JP); Masami Umetsu, Fujisawa (JP); Takahiro Hasegawa, Fujisawa (JP)

(73) Assignee: Oshikiri Machinery Ltd., Kanagawa-ken (JP)

( * ) Notice: Subject to any disclaimer, the term of this patent is extended or adjusted under 35 U.S.C. 154(b) by 499 days.

(21) Appl. No.: 12/676,225

(22) PCT Filed: Sep. 5, 2007

(86) PCT No.: PCT/JP2007/067325
§ 371 (c)(1),
(2), (4) Date: Mar. 3, 2010

(87) PCT Pub. No.: WO2009/031212
PCT Pub. Date: Mar. 12, 2009

(65) Prior Publication Data
US 2010/0180779 A1 Jul. 22, 2010

(51) Int. Cl.
*A23N 4/04* (2006.01)
*A47J 17/00* (2006.01)
(52) U.S. Cl. .......................................... 99/537; 426/503
(58) Field of Classification Search ............... 99/537; 426/231, 503; 241/30; 267/155
See application file for complete search history.

(56) References Cited

U.S. PATENT DOCUMENTS

| | | | | |
|---|---|---|---|---|
| 4,097,962 A | * | 7/1978 | Alley et al. | 452/43 |
| 4,268,532 A | * | 5/1981 | Bernard | 426/231 |
| 4,395,427 A | * | 7/1983 | Fischer et al. | 426/231 |
| 4,700,899 A | * | 10/1987 | Powers et al. | 241/30 |
| 4,948,611 A | * | 8/1990 | Cummins | 426/503 |
| 5,264,232 A | | 11/1993 | Campbell | |
| 5,270,070 A | * | 12/1993 | Campbell | 426/503 |
| 5,350,290 A | * | 9/1994 | Honings | 425/311 |
| 5,356,652 A | | 10/1994 | Campbell | |
| 6,303,168 B1 | * | 10/2001 | Campbell | 426/496 |
| 7,837,456 B2 | * | 11/2010 | Pedraja | 425/192 R |
| 2010/0180779 A1 | * | 7/2010 | Oki et al. | 99/537 |
| 2010/0206184 A1 | * | 8/2010 | Oki et al. | 99/538 |

FOREIGN PATENT DOCUMENTS

| | | |
|---|---|---|
| JP | 11-230385 | 8/1999 |
| JP | 2000-119665 | 4/2000 |
| JP | 2000-257731 | 9/2000 |
| JP | 2001-263534 | 9/2001 |

OTHER PUBLICATIONS

WIPO Translation download,JP200706735 Kneaded Dough Dividing Apperatus,http://patentscope.wipo.int/search/, 11 pages.*
International Search Report issued Nov. 13, 2007 in corresponding International Application No. PCT/JP2007/067325.

* cited by examiner

*Primary Examiner* — Gene Kim
*Assistant Examiner* — M Chambers
(74) *Attorney, Agent, or Firm* — Wenderoth, Lind & Ponack, L.L.P.

(57) ABSTRACT

A kneaded dough dividing apparatus has a divider vessel body having a dough inlet and two dough outlets for discharging kneaded dough as two streams of dough. The divider vessel body is provided therein with an outlet control member that simultaneously partially closes the two dough outlets. The outlet control member is displaceable relative to the two dough outlets to reduce the opening area of one of the two dough outlets when enlarging the opening area of the other of the two dough outlets and to reduce the opening area of the other dough outlet when enlarging the opening area of the one dough outlet.

6 Claims, 8 Drawing Sheets

KNEADED DOUGH DIVIDING APPARATUS

BACKGROUND OF THE INVENTION

I. Technical Field

The present invention relates to a kneaded dough dividing apparatus that divides and delivers continuously supplied kneaded dough as a plurality of streams of kneaded dough.

II. Description of the Related Art

In the production of bread, a mass of kneaded dough (batch) is prepared in a mixer, and this mass of kneaded dough is extruded as a continuous stream of kneaded dough by a pump and then divided into a plurality of streams of kneaded dough through a kneaded dough dividing apparatus. Thereafter, each stream of kneaded dough is divided into small pieces necessary for bread baking.

When divided into a plurality of streams of kneaded dough through the kneaded dough dividing apparatus, the kneaded dough needs to be divided under equal conditions for all the streams of dough; otherwise it is likely that the divided streams of dough will vary from each other in terms of dough texture, and when small pieces of cut kneaded dough are baked, it will be difficult to obtain bread products of uniform quality.

A typical previously known kneaded dough dividing apparatus has a manifold with one dough inlet and a plurality of dough outlets (see U.S. Pat. Nos. 4,948,611, 5,350,290 and 5,356,652).

This type of apparatus has the following disadvantages. There are differences in the flow path length in the manifold from the one inlet to the plurality of outlets. Therefore, there are differences in the frictional force that the streams of kneaded dough receive from the inner wall surface of the manifold. Because the kneaded dough is forced into the manifold of large volumetric capacity from one inlet under pressure, the kneaded dough is likely to circulate or partly reside in the manifold, and it is difficult to make uniform the pressure in the manifold. Further, a flow control valve is, generally, provided at each outlet to control the amount of kneaded dough discharged from the outlet. In this regard, if the valve at one outlet is adjusted to increase or decrease the opening area of the outlet, an influence is exerted upon the pressure in the manifold, and this has an effect on the amount of kneaded dough discharged from the other outlets. Consequently, it is necessary to adjust the valves at the other outlets.

SUMMARY OF THE INVENTION

Accordingly, the conventional kneaded dough dividing apparatus has difficulty in homogenizing a plurality of streams of kneaded dough discharged therefrom.

An object of the present invention is to solve the above-described problem.

Solution to Problem:

The present invention provides a kneaded dough dividing apparatus having a divider including a divider vessel body having one dough inlet that receives continuously supplied kneaded dough and two dough outlets for discharging the kneaded dough as two streams of kneaded dough. The divider further includes an outlet control member provided in the divider vessel body to simultaneously partially close the two dough outlets. The outlet control member is displaceable relative to the two dough outlets to reduce the opening area of one of the two dough outlets when enlarging the opening area of the other of the two dough outlets and to reduce the opening area of the other dough outlet when enlarging the opening area of the one dough outlet.

The kneaded dough dividing apparatus of the present invention is provided with a closing member that simultaneously partially closes two dough outlets. The closing member acts to increase the opening area of one of the two dough outlets when decreasing the opening area of the other dough outlet. Therefore, the total amount of kneaded dough discharged from the kneaded dough dividing apparatus can be kept substantially constant, and hence the pressure in the divider vessel body can be kept substantially constant. Thus, the quality of kneaded dough discharged from the apparatus can be kept constant.

Specifically, the kneaded dough dividing apparatus may be arranged as follows. The divider vessel body has a cylindrical inner peripheral wall surface that is bilaterally symmetric about an axis of the dough inlet extending in a direction in which the dough inlet receives the kneaded dough, and flat end wall surfaces that close the opposite ends of the inner peripheral wall surface. The two dough outlets are formed in the inner peripheral wall surface at respective positions that are bilaterally symmetric about the axis.

That is, the kneaded dough received from the inlet is allowed to flow through the bilaterally symmetric divider vessel body to reach the outlets under equal flow path conditions. Therefore, the streams of dough discharged from the two outlets can be made uniform in quality.

More specifically, the inner peripheral wall surface may have a circular cylindrical shape. This facilitates the production of the divider vessel body.

In a case where the divider vessel body has the above-described structure, the outlet control member may be a fan-shaped member pivotable about the center axis of the circular cylindrical inner peripheral wall surface. The fan-shaped member has an outlet-closing surface slidable along the inner peripheral surface. The outlet-closing surface changes the opening areas of the two dough outlets by pivoting about the center axis from a position where the outlet-closing surface simultaneously partially closes the two dough outlets.

The fan-shaped member may have a semicircular arc-shaped surface facing toward the dough inlet and centered at the center axis, and two side surfaces extending from the opposite end edges of the semicircular arc-shaped surface to the corresponding opposite end edges of the outlet-closing surface.

More specifically, the arrangement may be as follows. The dough outlets have a circular cross-section, and the opposite end edges of the outlet-closing surface of the fan-shaped member respectively have semicircular recesses having a diameter substantially equal to the diameter of the circular cross-section of the dough outlets. The two side surfaces of the fan-shaped member respectively have grooves of substantially semicircular cross-section extending from the recesses toward the circular arc-shaped surface of the fan-shaped member.

With the arrangement in which the two dough outlets have a circular cross-section and are partially closed with the closing surface having semicircular arc-shaped recesses at its opposite end edges as stated above, the total of the opening areas of the two dough outlets can be readily kept substantially constant when the openings areas of the two dough outlets are controlled by pivoting the fan-shaped member.

Further, the arrangement may be as follows. The at least one divider includes three dividers, i.e. a first divider, a second divider, and a third divider. The kneaded dough dividing apparatus has a pair of dough feed pipes connected to the dough outlets of the first divider. The dough inlets of the second and third dividers are connected to the pair of dough feed pipes, respectively. The pair of dough feed pipes have the same length from the dough outlets of the first divider to the dough inlets of the second and third dividers. With this arrangement, the kneaded dough can be discharged as four streams of dough, and the four streams can be divided under substantially the same flow path conditions.

The outlet control members of the second and third dividers may each have an outlet-closing surface sufficiently large to allow the opening area of one of the two dough outlets to be controlled with the other dough outlet fully closed. In this case, the kneaded dough can be divided into three streams of dough, and necessary control can be performed.

DETAILED DESCRIPTION OF THE INVENTION

Embodiments of the kneaded dough dividing apparatus according to the present invention will be explained below with reference to the accompanying drawings.

Figure 1:
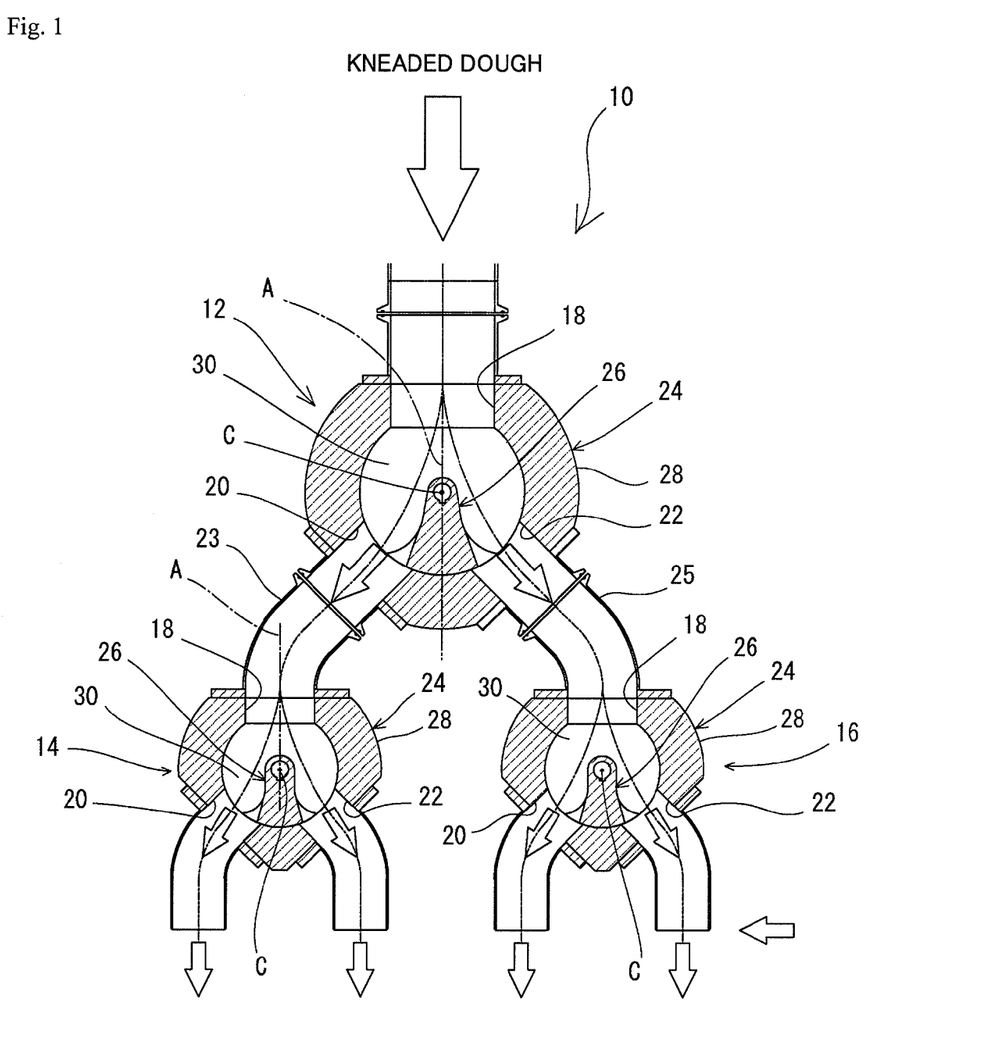
FIG. 1 is a diagram for explaining the basic structure of a kneaded dough dividing apparatus according to the present invention.

FIG. 1 is a diagram showing the basic structure of the kneaded dough dividing apparatus 10 according to the present invention. This apparatus divides kneaded dough, e.g. bread dough, supplied thereto into four streams of dough. At the downstream side of each of the four divided streams of dough, a cut-off device (not shown) is provided to cut off the associated stream of dough into small pieces (each corresponding to one bread product to be baked).

That is, the kneaded dough dividing apparatus 10 has a first divider 12 that divides kneaded dough supplied from a dough supply pump (not shown) at the upstream side into two streams of dough, and second and third dividers 14 and 16 that respectively receive the two streams of kneaded dough divided by the first divider 12 and that each divide the received kneaded dough into two streams of dough.

The first to third dividers 12, 14 and 16 have the same basic structure.

That is, these dividers each have a divider vessel body 24 having one dough inlet 18 that receives continuously supplied kneaded dough and two dough outlets 20 and 22 for discharging the kneaded dough as two streams of dough. Each divider further has an outlet control member 26 provided in the divider vessel body 24 and that can simultaneously partially close the two dough outlets 20 and 22. The dough outlets 20 and 22 of the first divider 12 are connected to the dough inlets 20 of the second and third dividers 14 and 16 through first and second dough feed pipes 23 and 25, respectively.

Specifically, the divider vessel body 24 has a cylindrical wall 28 with a circular cylindrical inner peripheral surface and flat end wall surfaces 30 and 32 (FIG. 4) that close the opposite ends of the cylindrical wall 28. The cylindrical wall 28 has a dough inlet 18 and dough outlets 20 and 22. The dough outlets 20 and 22 are positioned in bilateral symmetry about an axis A of the dough inlet 18 passing through the center axis C of the inner peripheral surface of the cylindrical wall 28.

Figure 4:
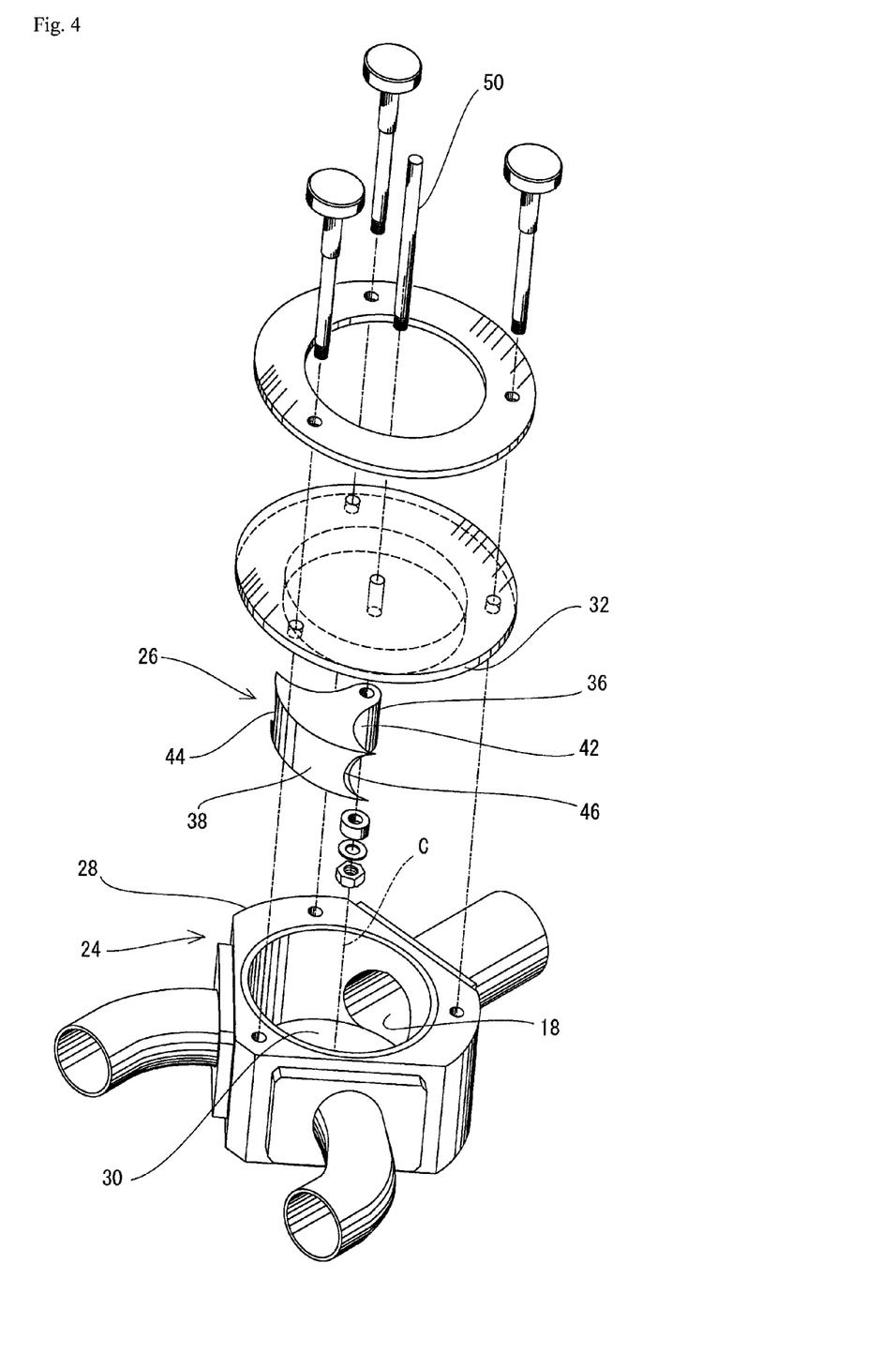
FIG. 4 is an exploded perspective view of the divider.
Figure 5:
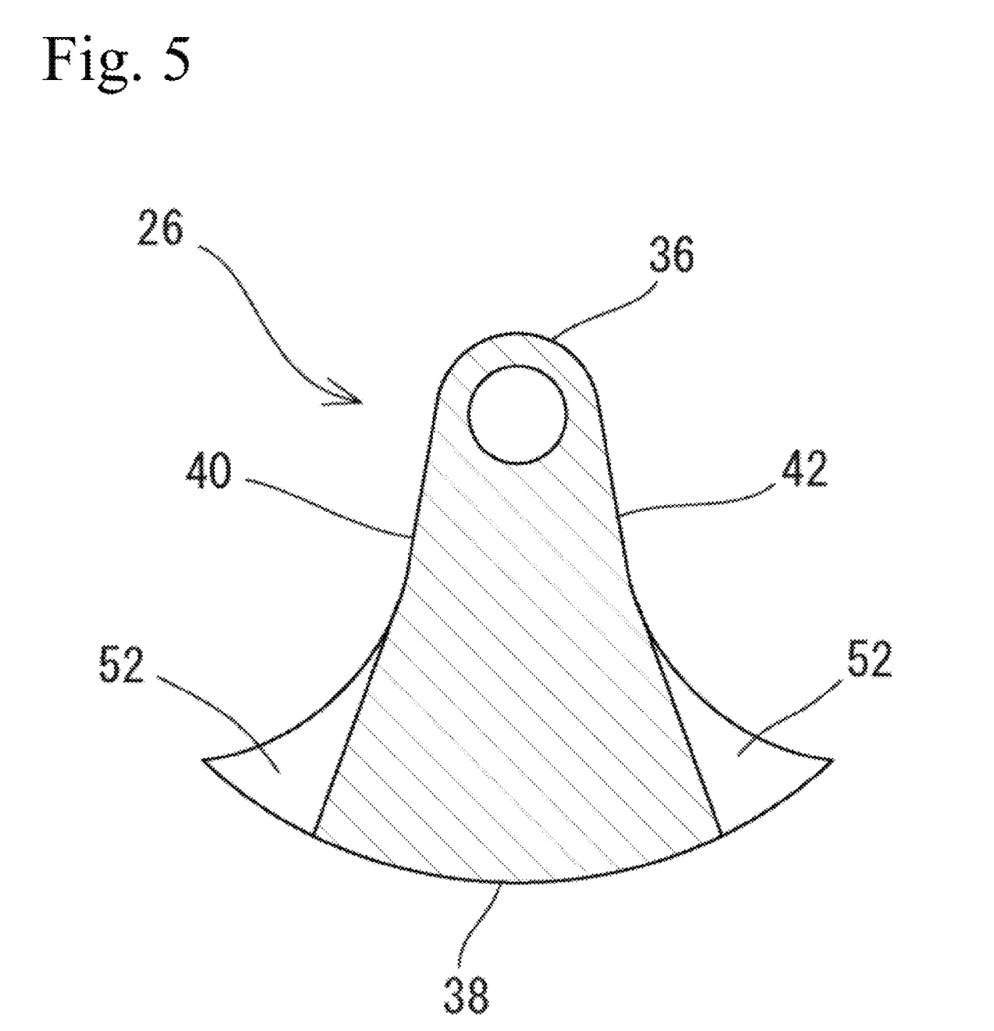
FIG. 5 is a sectional front view of an outlet control member.
Figure 6:
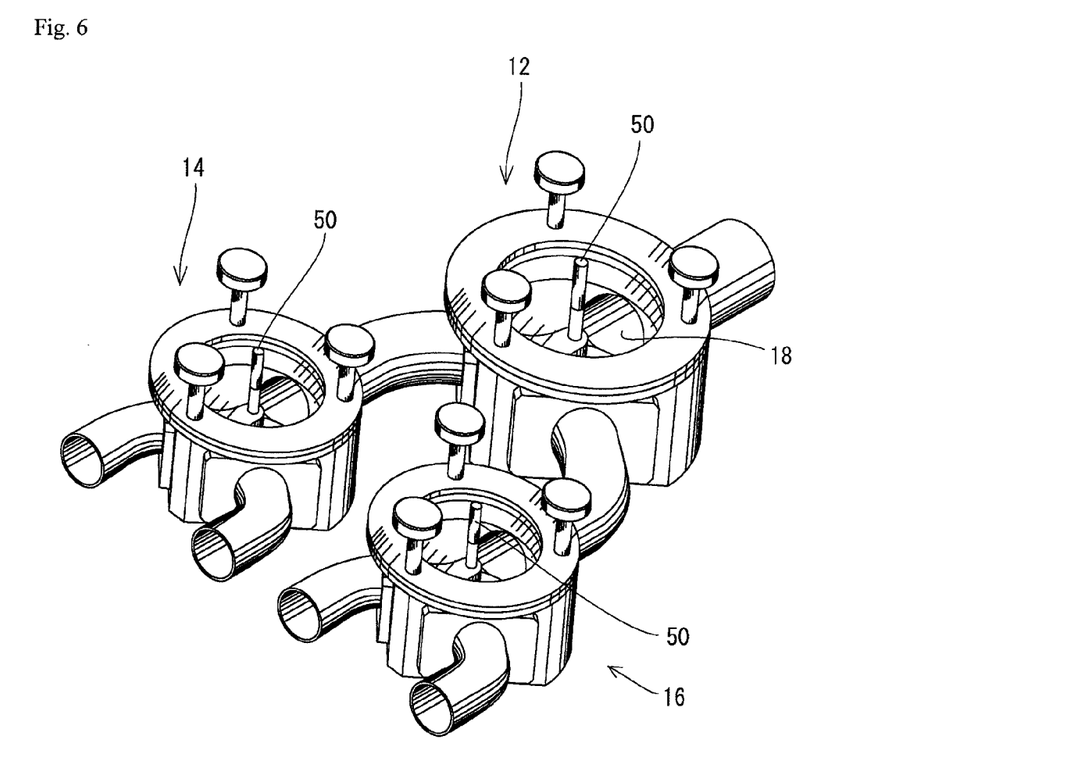
FIG. 6 is a perspective view of the kneaded dough dividing apparatus according to the present invention, with the upper end wall removed from each divider of the apparatus to show the interior of the divider.

The outlet control member 26 is a fan-shaped member pivotable about the center axis C of the inner peripheral surface of the cylindrical wall 28. As shown in FIGS. 4 and 5 in particular, the outlet control member 26 has an upstream surface 36 facing toward the dough inlet 18 and in the shape of a semicircular arc centered at the center axis C, an outlet-closing surface 38 slidable along the inner peripheral surface of the cylindrical wall 28, and curved side surfaces 40 and 42 respectively extending from the opposite sides of the upstream surface 36 to the opposite end edges of the outlet-closing surface 38.

The outlet control member 26 is arranged as follows. When the center position between the opposite ends of the outlet-closing surface 38 is at the center position between the dough outlets 20 and 22, as shown in part (b) of FIG. 2, the opposite end portions of the outlet-closing surface 38 simultaneously partially close the dough outlets 20 and 22 by the same amount.

Specifically, the dough outlets 20 and 22 have a circular cross-section, and the opposite end portions of the outlet-closing surface 38 of the outlet control member 26 have semicircular recesses 44 and 46, respectively, which have a diameter substantially equal to the diameter of the circular cross-section of the dough outlets 20. Therefore, the two side surfaces 40, 42 of the outlet control member 26 respectively have grooves 52 of substantially semicircular cross-section extending from the recesses 44 and 46 toward the circular arc-shaped upstream surface 36 of the outlet control member 26. When the outlet control member 26 is at the neutral position in part (b) of FIG. 2, the edge positions of the outlet-closing surface 38 that define the recesses 44 and 46 partially close the dough outlets 20 and 22 by the same amount.

With the outlet control member 26 arranged as stated above, the mass of kneaded dough discharged from the dough outlets 20 and 22 can be controlled as follows.

Figure 2:
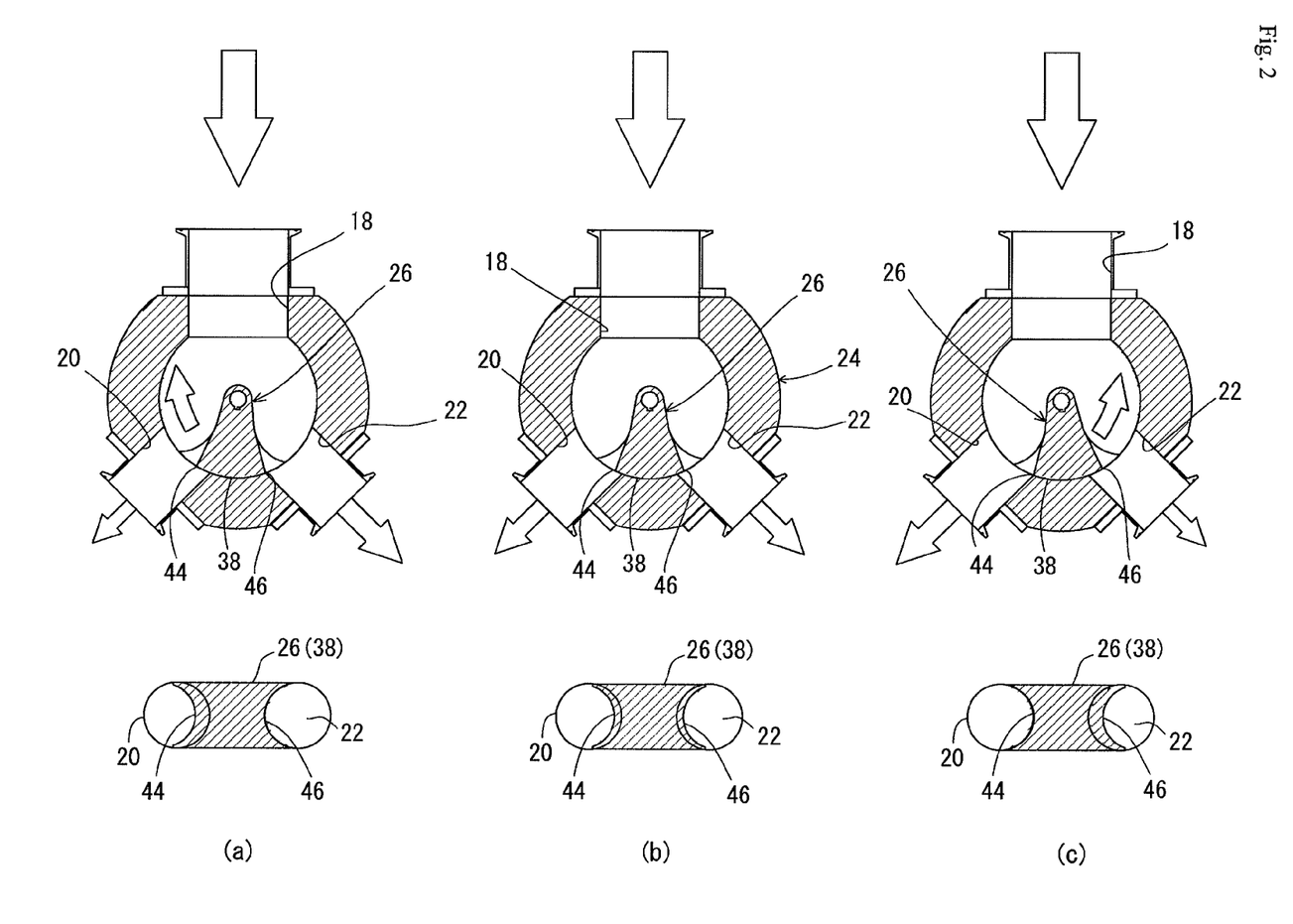
FIG. 2 is a diagram for explaining the dough dividing operation of each divider of the kneaded dough dividing apparatus.
Figure 3:
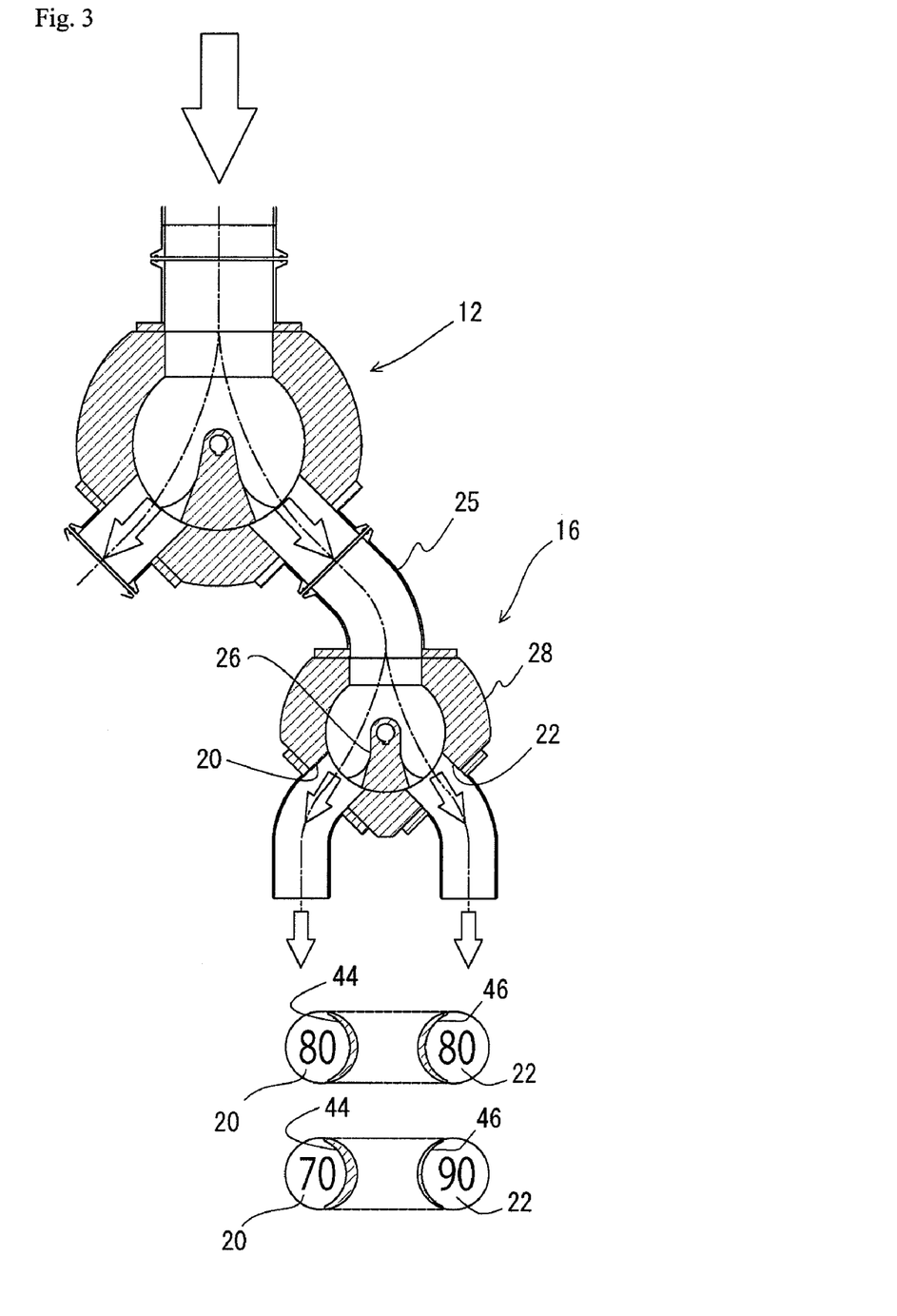
FIG. 3 is a diagram for explaining the dough dividing operation even more specifically.

As shown in FIG. 3, the divider 16 is assumed to have been set so that when the outlet control member 26 is at the neutral position shown in part (b) of FIG. 2, each of the dough outlets 20 and 22 is closed by 20 percent of its overall opening area, and the opening degree is 80 percent. If the outlet control member 26 is pivotally displaced clockwise from the neutral position as shown in part (a) of FIG. 2 to increase the opening area of the right dough outlet 22 (as seen in FIGS. 2 and 3) by 10 percent of the overall opening area to thereby increase the opening degree to 90 percent, the outlet control member 26 simultaneously reduces the opening area of the left dough outlet 20 by about 10 percent. That is, in the divider 16, even if the opening areas of the dough outlets 20 and 22 are controlled as stated above, the total of the opening areas of the dough outlets 20 and 22 is kept substantially the same as that when the outlet control member 26 is at the neutral position. Consequently, the total amount of kneaded dough discharged from the divider 16 is kept substantially constant. Accordingly, the dough outlet opening can be controlled without exerting an influence upon the upstream divider 12, and hence the divider 14. The same is the case when the outlet control member 26 of the divider 16 is pivoted counterclockwise from the neutral position as shown in part (c) of FIG. 2.

Specifically, to pivot the outlet control member 26, it is preferable that the outlet control member 26 be secured to a pivot shaft 50 provided along and rotatable about the center axis C and that the pivot shaft 50 be rotationally driven by a driving means, e.g. a servomotor. Regarding the drive of the driving means, it is preferable that the driving means be capable of being controlled from the control panel (not shown) of the kneaded dough dividing apparatus. It is also preferable that the driving means be capable of being feedback-controlled by measuring the mass of kneaded dough discharged from the kneaded dough dividing apparatus or by measuring the pressure in each divider vessel.

Figure 7:
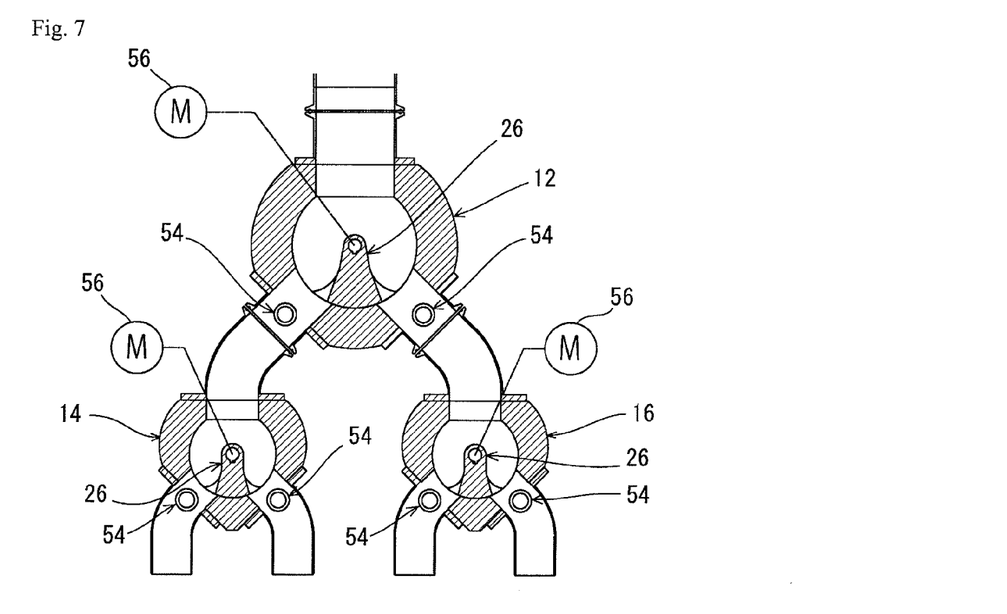
FIG. 7 is a diagram showing an example in which pressure sensors are provided at the dough outlets, respectively, of each divider of the kneaded dough dividing apparatus to perform feedback control.
Figure 8:
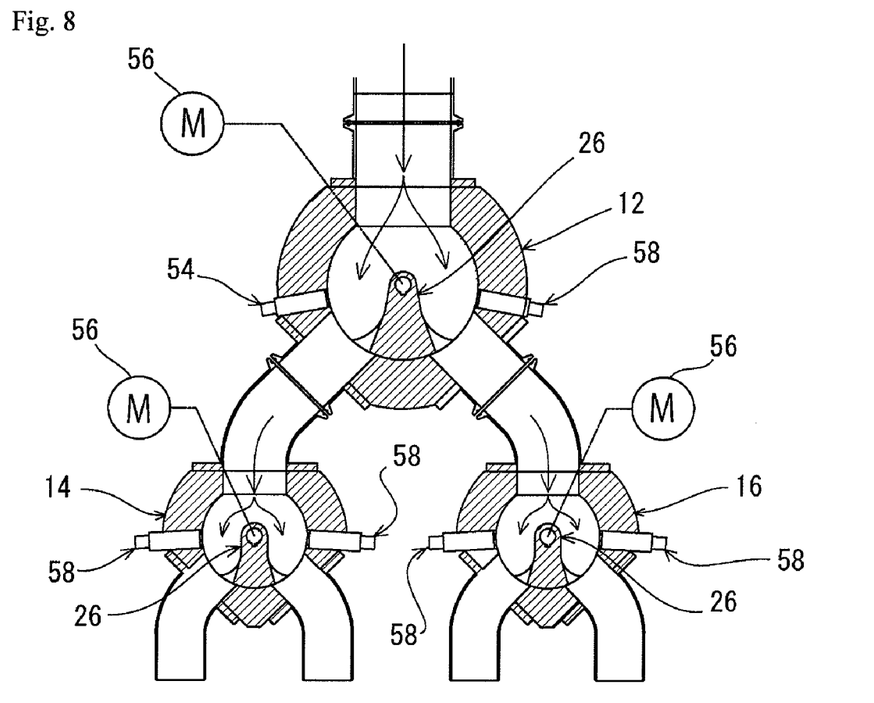
FIG. 8 is a diagram showing an example in which each divider is provided with pressure sensors that measure pressures in the divider to perform feedback control.

FIG. 7 shows a system in which the pressures of kneaded dough discharged from the dough outlets 20 and 22 of the dividers 12, 14 and 16 are detected with pressure sensors 54, and the rotation of the pivot shaft 50 in each of the dividers 12, 14 and 16 is controlled with a servomotor 56 on the basis of the detected pressure of kneaded dough. FIG. 8 shows a system in which the pressures of kneaded dough divided into two streams of dough flowing toward the two dough outlets 20 and 22 by the outlet control member 26 in each of the dividers 12, 14 and 16 are detected with pressure sensors 58, and the rotation of the pivot shaft 50 in each divider is controlled with the servomotor 56 on the basis of the detected pressure of kneaded dough.

When feedback control is performed by measuring the mass of kneaded dough discharged from the kneaded dough dividing apparatus, it is preferable to measure the mass of kneaded dough before the four streams of kneaded dough are each cut off by the cut-off device into small pieces each corresponding to one bread product to be baked and put into an intermediate fermentation machine.

Figure 9:
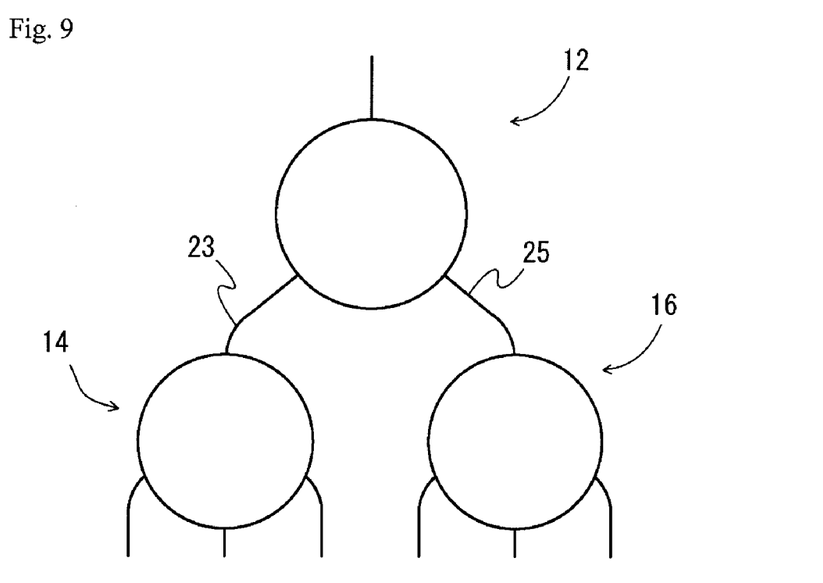
FIG. 9 is a diagram for explaining the basic structure of a second embodiment of the kneaded dough dividing apparatus according to the present invention.
Figure 10:
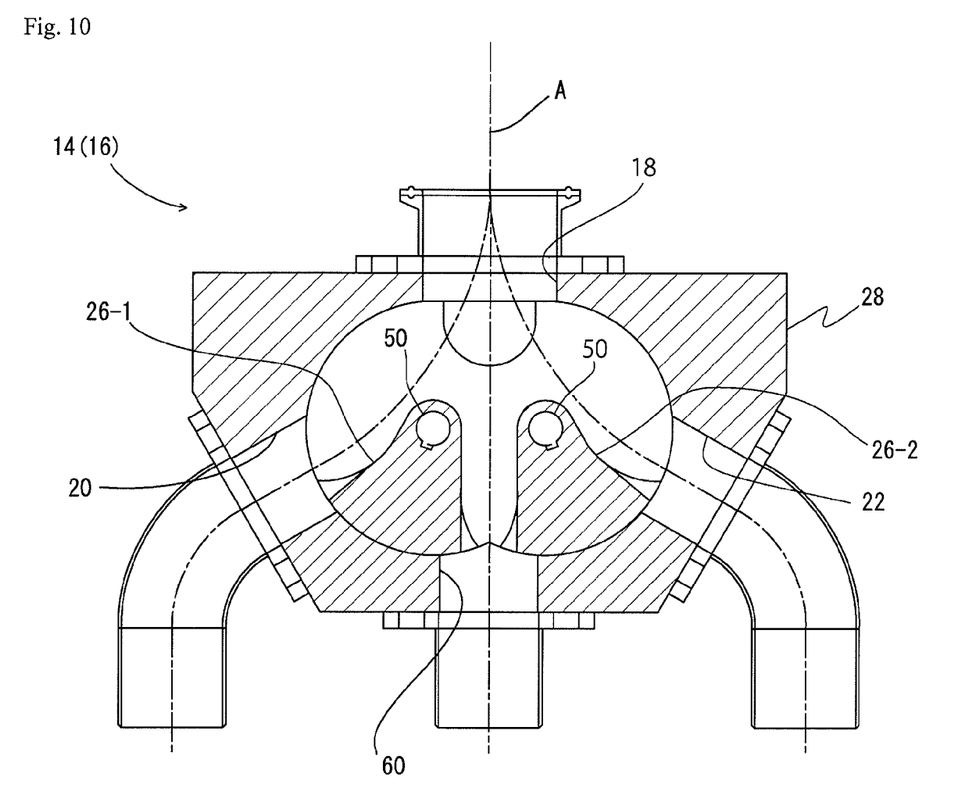
FIG. 10 is a sectional view of second and third dividers of the apparatus shown in FIG. 9.

FIG. 9 is a conceptual view of a kneaded dough dividing apparatus in which the second and third dividers 14 and 16 are provided with third dough outlets 60, respectively. FIG. 10 is an enlarged view of the second and third dividers 14 and 16. As shown in the figures, the dividers 14 and 16 each have two fan-shaped outlet control members 26-1 and 26-2 in the cylindrical wall 28. The outlet control member 26-1 controls the opening degree of the dough outlets 20 and 60, and the outlet control member 26-2 controls the opening degree of the dough outlets 22 and 60. The relationship between each outlet control member and the two associated dough outlets is the same as that in the foregoing embodiment. That is, when placed at the neutral position, each outlet control member partially closes the two associated dough outlets. The opening degree is controlled by rotating the pivot shaft 50. In this embodiment, it is also possible to keep constant the total amount of kneaded dough introduced from the dough inlet 18 and discharged from the dough outlets. In each divider, the regions of the inner peripheral surface of the cylindrical wall 28 along which the outlet-closing surfaces of the two outlet control members 26-1 and 26-1 slide are each in the shape of a circular arc centered at the pivot shaft of each outlet control member. The inner peripheral surface as a whole, however, should preferably be bilaterally symmetric about the axis A passing through the dough inlet 18.

Although some embodiments of the kneaded dough dividing apparatus according to the present invention have been described above, the present invention is not limited to the described embodiments but can be modified in a variety of ways. For example, in the illustrated example, the dough outlets 20 and 22 have a circular sectional configuration to achieve an efficient production, and the circular arc-shaped recesses 44 and 46 are formed at the opposite end edges of the outlet-closing surface 38 of the outlet control member 26 in conformity to the circular sectional configuration of the dough outlets 20 and 22. To allow the opening degree of one of the dough outlets 20 and 22 to decrease by the same amount as the increase in the opening degree of the other dough outlet caused by the outlet control member 26, however, it is preferable that the dough outlets 20 and 22 each be a rectangular opening that extends circumferentially of the cylindrical wall 28 and whose opposite end edges are straight lines extending in the width direction of the cylindrical wall 28 and that the opposite end edges of the outlet-closing surface 38 be straight lines extending in the width direction of the cylindrical wall 28. Although in the illustrated example the kneaded dough is divided into four streams of dough, the present invention is not limited to the described arrangement. The system may be arranged to allow the opening area of one of the two dough outlets 20 and 22 to be controlled with the other dough outlet fully closed by the outlet control member 26 of each of the dividers 14 and 16. In this case, it is necessary to make the distance between the dough outlets 20 and 22 longer than the illustrated one and to increase the outlet-closing surface 38 of the outlet control member 26 to allow one dough outlet to be partially closed with the other dough outlet closed.

The invention claimed is:

1. A kneaded dough dividing apparatus comprising:
   at least one divider, the at least one divider comprising
   a divider vessel body having one dough inlet configured to continuously receive supplied kneaded dough and first and second dough outlets configured to discharge the kneaded dough as first and second streams of kneaded dough, respectively, and
   an outlet control member in the divider vessel body, and being configured to simultaneously partially close the first and second dough outlets, the outlet control member being displaceable relative to the first and second dough outlets so as to reduce an opening area of the first dough outlet when enlarging an opening area of the second dough outlet and to reduce the opening area of the second dough outlet when enlarging the opening area of the first dough outlet,
   wherein the divider vessel body has a cylindrical inner peripheral wall surface, and flat end wall surfaces that close opposite ends of the inner peripheral wall surface, the one dough inlet and the first and second dough outlets opening in the cylindrical inner peripheral wall, the first and second dough outlets being substantially bilateral and symmetrical about an axis of the one dough inlet extending in a direction in which the dough is to be introduced into an inside of the cylindrical wall through the one dough inlet, the axis intersecting with a center axis of the cylindrical inner peripheral wall surface,
   wherein the outlet control member is a fan-shaped member pivotable about the center axis of the cylindrical inner peripheral wall surface, the fan-shaped member having an outlet-closing surface that is slidable along the cylindrical inner peripheral surface, the outlet-closing surface capable of changing the opening areas of the first and second dough outlets by pivoting about the center axis,
   wherein the fan-shaped member has a semicircular arc-shaped surface facing toward the one dough inlet and centered at the center axis, and first and second side surfaces extending from opposite first and second end edges of the semicircular arc-shaped surface, respectively, the first and second side surfaces extending to corresponding opposite first and second end edges of the outlet-closing surface, wherein the first and second dough outlets have a circular cross-section, wherein the opposite first and second end edges are in a circumferential direction of the cylindrical inner surface, and each first and second end edge has a semicircular recess with a radius substantially equal to a radius of the circular cross-section of the dough outlets, and wherein each of the first and second side surfaces of the fan-shaped member has a groove with a semicircular cross-section extending from a respective semicircular recess toward the semicircular arc-shaped surface of the fan-shaped member.

2. The kneaded dough dividing apparatus of claim 1, wherein the at least one divider is a first divider of three dividers including the first divider, a second divider, and a third divider;

the kneaded dough dividing apparatus having first and second dough feed pipes connected to the first and second dough outlets of the first divider, respectively;

dough inlets of the second and third dividers being connected to the first and second dough feed pipes, respectively;

the first and second dough feed pipes having a same length from the first and second dough outlets of the first divider to the dough inlets of the second and third dividers.

3. The kneaded dough dividing apparatus of claim 2, wherein outlet control members of the second and third dividers each have an outlet-closing surface sufficiently large to enable the opening area of one of the first and second dough outlets to be controlled with the other of the first and second dough outlets fully closed.

4. The kneaded dough dividing apparatus of claim 2, wherein each of the second and third dividers has a divider body with an outlet control member, and the outlet control member in the divider vessel body of at least one of the first to third dividers is controlled on a basis of a result of measurement of at least one of pressures of kneaded dough divided to the first and second dough outlets by the outlet control member, pressures at the first and second dough outlets, and mass of kneaded dough discharged from the first and second dough outlets.

5. The kneaded dough dividing apparatus of claim 2, wherein each of the second and third dividers has a third dough outlet, and a second outlet control member, for each of the second and third dividers, the second outlet control member simultaneously partially closing one dough outlet of the first and second dough outlets and the third dough outlet, the second outlet control member being displaceable relative to the one dough outlet and the third dough outlet so as to reduce an opening area of one of the one dough outlet and the third dough outlet when enlarging an opening area of the other of the one dough outlet and the third dough outlet and to reduce the opening area of the other of the one dough outlet and the third dough outlet when enlarging the opening area of the one of the one dough outlet and the third dough outlet.

6. The kneaded dough dividing apparatus of claim 1, wherein the inner peripheral wall surface has a circular cylindrical shape.

\* \* \* \* \*